United States Patent
Aoyama et al.

(10) Patent No.: US 6,281,297 B1
(45) Date of Patent: Aug. 28, 2001

(54) ISOBUTYLENE RUBBER PARTICLES, GRAFT COPOLYMER PARTICLES AND RESIN COMPOSITION CONTAINING THE SAME

(75) Inventors: Taizo Aoyama, Takasago; Katsuhiko Kimura, Akashi, both of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/184,899

(22) Filed: Nov. 3, 1998

(30) Foreign Application Priority Data

Nov. 4, 1997 (JP) .................................................... 9-318933

(51) Int. Cl.$^7$ .................................................... C08F 10/10
(52) U.S. Cl. .................................... 525/333.7; 526/348.7; 524/579; 525/67; 525/64; 525/66; 525/78; 525/70
(58) Field of Search ...................... 526/348.7; 525/333.7, 525/64, 67, 66, 78, 70; 524/579

(56) References Cited

U.S. PATENT DOCUMENTS

| | | | |
|---|---|---|---|
| 3,644,263 | * 2/1972 | Burke | 523/326 |
| 4,506,056 | * 3/1985 | Gaylord | 524/445 |
| 4,946,899 | 8/1990 | Kennedy et al. | 525/244 |
| 5,079,302 | * 1/1992 | Lee et al. | 525/256 |
| 5,242,983 | 9/1993 | Kennedy et al. | 525/309 |
| 5,395,885 | 3/1995 | Kennedy et al. | 525/98 |

FOREIGN PATENT DOCUMENTS

506515 * 9/1992 (EP) .

* cited by examiner

*Primary Examiner*—Rachel Gorr
(74) *Attorney, Agent, or Firm*—Armstrong, Westerman, Hattori, McLeland & Naughton, LLP

(57) ABSTRACT

Isobutylene rubber particles comprising a finely divided isobutylene polymer, and isobutylene-based graft copolymer particles comprising the isobutylene rubber particles and a vinyl monomer graft-polymerized onto the particles, which are useful as an impact modifier having excellent weatherability and thermal stability for thermoplastic resins and provide a thermoplastic resin composition having an improved impact resistance.

18 Claims, No Drawings ately the
present invention relates to isobutylene rubber particles and
isobutylene-based graft copolymer particles, which are useful as an impact resistant resin or an impact modifier having
excellent weatherability and heat stability, and further to a
thermoplastic resin composition containing these particles
which exhibits a high impact resistance with maintaining
properties such as weatherability and thermal stability and is
suitable for production of molded articles such as sheet and
film.

Impact modifiers have been used for imparting an impact
resistance to various resins. Various impact modifiers have
been proposed, and a core-shell graft copolymer prepared by
graft-polymerizing a vinyl monomer (which forms a shell
layer) onto a rubber-containing crosslinked particles (which
forms a core layer) has been industrially widely used as an
impact modifier. It has been recognized that the rubber
component of the core layer serves to improve the impact
resistance of thermoplastic resins, and the vinyl polymer of
the shell layer serves to have a compatibility (namely
dispersibility and adhesion property) with various resins.
For example, as an impact modifier is well known a graft
copolymer of a polybutadiene rubber and a vinyl monomer
graft-polymerized onto the rubber. However, since a polybutadiene rubber contains unsaturated bonds and accordingly
is thermally unstable, such an impact modifier having excellent thermal stability and weatherability has not been
obtained.

A graft copolymer prepared by graft-polymerizing a vinyl
monomer onto an acrylic rubber is also known as an impact
modifier. An acrylic rubber is excellent in thermal stability
and weatherability, but it has a relatively high Tg (glass
transition temperature) and therefore the graft copolymer
does not have a significant effect of improving impact
resistance.

An impact modifier having a low Tg and being excellent
in thermal stability and weatherability is known from JP-A-60-252613 and JP-A-2-8209, which disclose a graft copolymer prepared by graft-polymerizing a vinyl monomer onto
a polyorganosiloxane rubber (silicone rubber). This impact
modifier has, to some degree, the effect of improving impact
resistance, but more improvement has been demanded. Also,
this impact modifier deteriorates the processability and
surface gloss of thermoplastic resins incorporated therewith.

Accordingly, an object of the present invention is to
provide an impact modifier which is superior in weatherability and thermal stability and can improve the impact
resistance of various thermoplastic resins without substantially lowering the processability and surface gloss.

A further object of the present invention is to provide
rubber particles or rubber-containing graft copolymer particles which are useful as such an impact modifier.

Another object of the present invention is to provide a
thermoplastic resin composition which is remarkably
improved in impact resistance without substantially lowering the properties that the thermoplastic resins originally
possess, such as excellent weatherability, heat stability and
processability.

These and other objects of the present invention will
become apparent from the description hereinafter.

SUMMARY OF THE INVENTION

It has been found that rubber particles comprising an
isobutylene polymer and graft copolymer particles prepared
by graft-polymerizing a vinyl monomer onto the isobutylene
rubber particles are useful as an impact modifier and can
improve the impact resistance of thermoplastic and thermosetting resins without substantially lowering the processability and surface gloss of the resins, thus providing resin
compositions having a remarkably improved impact resistance and excellent processability, weatherability, thermal
stability, surface gloss and the like.

In accordance with the present invention, there is provided isobutylene rubber particles comprising an isobutylene polymer.

The isobutylene polymer may contain a crosslinking
agent, a graftlinking agent or a reactive functional group.

The present invention also provides particles of a graft
copolymer of the above isobutylene rubber and a vinyl
monomer graft-polymerized onto particles of the isobutylene rubber.

Further, the present invention provides a resin composition comprising 99 to 1 parts by weight of a thermoplastic
resin and 1 to 99 parts by weight of at least one of the
isobutylene rubber particles and the graft copolymer particles mentioned above.

DETAILED DESCRIPTION

The isobutylene polymer which constitutes the isobutylene rubber particles of the present invention can be prepared from a known isobutylene polymer and optionally a
crosslinking agent and/or a graftlinking agent, for example,
by finely dividing a raw material isobutylene polymer and
subjecting the resulting isobutylene polymer particles to a
crosslinking reaction of the isobutylene polymer.

The isobutylene polymer is a polymer which comprises at
least 50% by weight, preferably at least 70% by weight,
more preferably from 80 to 99% by weight, of units derived
from isobutylene, and preferably which contains at least one
functional group at its molecular end and/or in its molecular
chain, e.g., a halogen-containing group, a radical-reactive
unsaturated group or a silicon-containing group. The other
units than the isobutylene unit, which constitute the isobutylene polymer, include, for instance, a unit derived from an
initiator used when preparing the isobutylene polymer, a unit
derived from a cationically polymerizable monomer which
is used in the preparation of the isobutylene polymer as
occasion demands, a unit derived from the reactive functional group introduced into the molecular end and/or the
molecular chain of the isobutylene polymer, and the like.

Examples of the cationically polymerizable monomer
which may be used in the preparation of the isobutylene
polymer are, for instance, an aromatic alkenyl compound
such as styrene, α-methylstyrene or p-methylstyrene, vinyl
ether, indene, vinyl carbazole and the like.

Examples of the reactive functional group which can be
present in the molecular chain end(s) and/or molecular chain
of the isobutylene polymer are, for instance, an unsaturated
double bond derived from a conjugated diene monomer, a
functional group represented by the formula (I):

$$—R—X \qquad (I)$$

wherein R is a single bond or a divalent hydrocarbon group
having 1 to 20 carbon atoms, and X is a halogen atom, vinyl
group, allyl group, isopropenyl group, allyloxy group, acryloyl group, methacryloyl group, epoxy group, amino group,
cyano group, isocyano group, cyanate group, isocyanate
group, carboxyl group, acid anhydride residue, hydroxyl
group, mercapto group or a silicon-containing group represented by the formula:

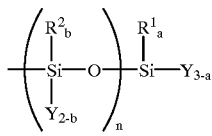

wherein $R^1$ and $R^2$ are individually a hydrocarbon group having 1 to 20 carbon atoms or a triorganosiloxy group, $Y^1$ and $Y^2$ are individually hydrogen atom, hydroxyl group or a hydrolyzable group, a is 0 or an integer of 1 to 3, b is 0 or an integer of 1 to 2, and n is 0 or an integer of 1 to 18; provided that each of $R^1$, $R^2$, $Y^1$ and $Y^2$ may be the same or different when each group exists two or more times. Allyl group and silicon-containing group are preferable as the group X. The hydrolyzable group includes, for instance, alkoxyl, acyloyloxy, ketoxime, amino, amido, aminoxy, mercapto and alkenyloxy groups.

Examples of the isobutylene polymer used in the preparation of the isobutylene rubber particles are, for instance, a copolymer comprising units derived from isobutylene monomer and units derived from isoprene monomer, e.g., at most 5% by weight of isoprene units, which is generally known as so-called "butyl rubber" and is commercially available, e.g., JSR Butyl 268 (available from Japan Synthetic Rubber Co., Ltd.), KALAR5263 and KALENE800 (both available from HARDMAN INCORPORATED); a low molecular weight polyisobutylene oil having an average molecular weight of about 300 to about 5,000 and having an isopropenyl group at one molecular end, which is generally called "polybutene" and is commercially available, e.g., Nisseki Polybutene HV-3000 (available from Nippon Sekiyu Kagaku Kabushiki Kaisha), Nissan Polybutene 200N (available from NOF Corporation) and Idemitsu Polybutene 300R (available from Idemitsu Sekiyu Kagaku Kabushiki Kaisha); a high molecular weight polyisobutylene having a viscosity average molecular weight of 30,000 to 60,000 and having an isopropenyl group at one molecular end, e.g., "Tetolax" (available from Nippon Petrochemicals Co., Ltd.); a polyisobutylene having an allyl terminal group as disclosed in JP-B-7-53768; a polyisobutylene having a silicon-containing terminal group as disclosed in JP-B-4-69659; and the like. Allyl group-terminated polyisobutylene and silicon-containing group-terminated polyisobutylene are preferred.

The isobutylene polymer which constitutes the isobutylene rubber particles may contain a moiety derived from a crosslinking agent and/or a graftlinking agent.

The crosslinking agent which is used as occasion demands, is selected according to the presence or absence of the functional group in the isobutylene polymer and the kind of the functional group. In case that the isobutylene polymer has a plurality of functional groups or has a polyfunctional group in a molecule, it is possible to crosslink rubber particles even if no crosslinking agent is used.

In case that the isobutylene polymer does not contain a reactive functional group, organic peroxides such as benzoyl peroxide, dicumyl peroxide, di-t-butyl peroxide and 1,1-bis(t-hexylperoxy)-3,3,5-trimethylcyclohexane are preferably used as the crosslinking agent. From the viewpoints of reactivity and cost, 1,1-bis(t-hexylperoxy)-3,3,5-trimethylcyclohexane is particularly preferred.

In case that the reactive functional group of the isobutylene polymer is an unsaturated double bond such as vinyl group, preferable crosslinking agents include, for instance, ethylene glycol dimethacrylate, propylene glycol dimethacrylate, 1,3-butylene glycol dimethacrylate, 1,4-butylene glycol dimethacrylate, divinyl benzene, and the like. Divinyl benzene is particularly preferred from the viewpoints of reactivity and cost.

In case that the reactive functional group of the isobutylene polymer is the silicon-containing group, preferable crosslinking agents include, for instance, a trifunctional silane compound such as trimethoxymethylsilane or triethoxyphenylsilane; a tetrafunctional silane compound such as tetramethoxysilane, tetraethoxysilane, tetrapropoxysilane or tetrabuthoxysilane; and the like. Tetraethoxysilane is particularly preferred from the viewpoints of reactivity and cost.

The graftlinking agent can be used as occasion demands. It is selected according to the kind of the functional group of the isobutylene polymer.

In case that the reactive functional group of the isobutylene polymer is an unsaturated double bond such as vinyl group, graftlinking agents such as allyl methacrylate, triallyl cyanurate, triallyl isocyanurate, and the like are preferably used. Allyl methacrylate is particularly preferred from the viewpoints of reactivity and cost.

In case that the isobutylene polymer contains a silicon-containing group as the reactive functional group, preferable examples of the graftlinking agent are, for instance, a (meth)acrylic functional silane compound such as β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydimethylsilane, γ-methacryloyloxypropyldiethoxymethylsilane, γ-methacryloyloxypropyltriethoxysilane, δ-methacryloyloxybutyldiethoxymethylsilane, γ-acryloyloxypropyldimethoxymethylsilane, or γ-acryloyloxypropyltrimethoxysilane; an ethylenic silane compound such as vinyltrimethoxysilane, vinyldimethoxymethylsilane, vinyltriethoxysilane, p-vinylphenyltrimethoxysilane or p-vinylphenyldimethoxymethylsilane; a mercapto functional silane compound such as γ-mercaptopropyltrimethoxysilane or γ-mercaptopropyldimethoxymethylsilane; and the like. From the viewpoints of reactivity and cost, particularly preferred are γ-methacryloyloxypropyldimethoxymethylsilane, γ-methacryloyloxypropyltrimethoxysilane and a mixture thereof.

The crosslinking agent and the graftlinking agent may be used alone or in admixture of two or more of them. The isobutylene polymer, the crosslinking agent and the graftlinking agent are used in such amounts that the isobutylene polymer is from 80 to 100% by weight, the crosslinking agent is from 0 to 20% by weight and the graftlinking agent is from 0 to 20% by weight, respectively, based on the total amount of the isobutylene polymer, crosslinking agent and graftlinking agent. Even if the crosslinking agent or the graftlinking agent is used in an amount of more than 20% by weight, additional effect on improvement in impact resistance is scarcely obtained, and the use in an amount of at most 20% by weight is preferable from an economical point of view. When both of the crosslinking agent and the graftlinking agent are used, the total amount thereof is preferably from 0 to 20% by weight with respect to 80 to 100% by weight of the isobutylene polymer. In this case, too, even if the amount is increased to more than 20% by weight, additional effect on improvement in impact resistance is scarcely obtained, and the use in an amount of at most 20% by weight is preferable from an economical point of view.

The isobutylene rubber particles of the present invention comprises the above-mentioned isobutylene polymer. It is preferable that the average particle size of the isobutylene rubber particles, in other words, isobutylene polymer particles, falls within the range of 0.05 to 10 μm. If the average particle size is less than or more than the above range, the effect of improving the impact resistance tends to become insufficient.

Isobutylene rubber particles may be crosslinked. When it is desired to maintain the particle shape even after molding processing, it is preferable that the gel fraction of the isobutylene rubber particles is at least 20% by weight, especially at least 50% by weight, more especially at least 70% by weight, measured by immersing the particles in toluene with stirring at room temperature for 8 hours and centrifuging an insoluble matter at 30,000 r.p.m. for 60 minutes.

The process for preparing the isobutylene rubber particles is not particularly limited, but an emulsification process is preferable. For example, the isobutylene rubber particles can be prepared by mixing an isobutylene polymer or a mixture of an isobutylene polymer and at least one of a crosslinking agent, graftlinking agent and a solvent with water in the presence of an emulsifying agent while applying a shearing force, for example, by means of a homogenizer to give a aqueous dispersion, and then subjecting the dispersion to a crosslinking reaction of the polymer to thereby obtain an aqueous latex of the isobutylene rubber particles. Examples of the solvent are, for instance, an aliphatic hydrocarbon such as n-hexane, n-heptane or n-octane, an aromatic hydrocarbon such as toluene or xylene, and a halogen-containing hydrocarbon such as chloroform or n-butyl chloride. Usually the crosslinking reaction is conducted at a temperature of about 20 to about 200° C. with stirring. If a polyisobutylene having a silicon-containing terminal group is used as the raw material isobutylene polymer, a condensation reaction of the silicon-containing group can be accelerated by making the crosslinking reaction system acidic with an inorganic acid such as hydrochloric acid, sulfuric acid or nitric acid or an organic acid such as an alkylbenzenesulfonic acid, an alkylsulfonic acid or an alkylsulfuric acid.

The thus prepared isobutylene rubber latex can be directly used, for example, as a coating material or an adhesive, and can also be used in the form of a powder by salting out and recovering the isobutylene rubber particles.

Further, the isobutylene rubber latex can be subjected to a graft copolymerization with a vinyl monomer to give an isobutylene-based graft copolymer particles.

Examples of the vinyl monomer to be graft-polymerized onto the isobutylene rubber particles are, for instance, an acrylic acid ester, e.g., an alkyl acrylate such as methyl acrylate, ethyl acrylate, n-propyl acrylate, n-butyl acrylate, 2-ethylhexyl acrylate or n-octyl acrylate; a methacrylic acid ester such as methyl methacrylate, ethyl methacrylate, n-butyl methacrylate, isobutyl methacrylate, t-butyl methacrylate, 2-ethylhexyl methacrylate, n-octyl methacrylate, cyclohexyl methacrylate, benzyl methacrylate or isobornyl methacrylate; an aromatic alkenyl compound such as styrene, α-methylstyrene, p-methylstyrene or vinyltoluene; a vinyl cyanide compound such as acrylonitrile or methacrylonitrile; a conjugated diene compound such as butadiene or isoprene; a halogen-containing unsaturated compound such as vinyl chloride or vinylidene chloride; and other vinyl compounds. The vinyl monomers may be used alone or in admixture thereof. The vinyl monomers can be suitably selected according to a combination with a resin to be improved in impact resistance.

In the graft polymerization, either or both of the crosslinking agent and the graftlinking agent can be used, as occasion demands. Each of them may be used alone or in admixture thereof.

Preferable examples of the crosslinking agent used in the graft polymerization are, for instance, ethylene glycol dimethacrylate, propylene glycol dimethacrylate, 1,3-butylene glycol dimethacrylate, 1,4-butylene glycol dimethacrylate, divinylbenzene and the like.

Preferable examples of the graftlinking agent used in the graft polymerization are, for instance, allyl methacrylate, triallyl cyanurate, triallyl isocyanurate and the like.

The proportions of the vinyl monomer, the crosslinking agent and the graftlinking agent used in the graft polymerization are from 80 to 100% by weight for the vinyl monomer, from 0 to 20% by weight for the crosslinking agent and 0 to 20% by weight for the graftlinking agent.

The proportion of the isobutylene rubber particles and the vinyl monomer used in the graft polymerization is not particularly limited. Preferably, the proportion of the isobutylene rubber particles is from 10 to 95% by weight, especially from 30 to 90% by weight, based on the weight of the obtained graft copolymer particles, and the proportion of the vinyl monomer component is from 90 to 5% by weight, especially from 70 to 10% by weight, based on the weight of the obtained graft copolymer particles. If the proportion of the vinyl monomer used in the graft polymerization is less than 5% by weight, the compatibility of the graft copolymer particles with various resins tends to lower, and if the proportion is more than 95% by weight, the impact resistance tends to lower.

The graft efficiency (percentage of the vinyl monomer grafted onto the rubber, based on the vinyl monomer used for graft polymerization) of the graft copolymer particles of the present invention is not particularly limited, but preferably it is at least 30% by weight, especially at least 50% by weight. If the graft efficiency is less than 30% by weight, the compatibility with various resins tends to lower.

The process for preparing the isobutylene-based graft copolymer particles of the present invention is not particularly limited, but preferably the graft copolymer is prepared, for example, by a process wherein a vinyl monomer is added to the above-mentioned isobutylene rubber latex and polymerized by a radical polymerization technique in a single stage or multi-stages to give an aqueous latex of the graft copolymer. When an isobutylene polymer having a silicon-containing terminal group has been used as the isobutylene polymer and the reaction system has been made acidic in the preparation of the rubber, the isobutylene rubber latex may be neutralized prior to conducting the graft polymerization by adding an aqueous solution of an alkali such as sodium hydroxide, potassium hydroxide or sodium carbonate to the latex.

The isobutylene rubber particles and the isobutylene-based graft copolymer particles obtained according to the processes as mentioned above themselves can be used as a molding material having an impact resistance, but are very useful as an impact modifier capable of providing a high degree of impact resistance to various thermoplastic and thermosetting resins when incorporated into these resins. These particles according to the present invention are also usable as a processing improver, a compatibilizer, a delustering agent or a heat resistance improver.

Examples of the thermoplastic resin to which the isobutylene rubber particles and the isobutylene-based graft copolymer particles of the present invention are applicable to improve the impact resistance thereof are, for instance, a vinyl chloride resin such as polyvinyl chloride or vinyl chloride-vinyl acetate copolymer, a polyolefin resin such as polyethylene, polypropylene or a cyclic olefin copolymer, polymethyl methacrylate, a homopolymer or copolymer of 70 to 100% by weight of at least one of at least one vinyl monomer selected from the group consisting of an aromatic alkenyl compound, a vinyl cyanide compound and a (meth)acrylic acid ester and 30 to 0% by weight of at least one other monomer copolymerizable therewith e.g., other vinyl monomer such as ethylene, propylene or vinyl acetate and a diene monomer such as butadiene or isoprene, polystyrene, polyphenylene ether, a mixture of polystyrene and polyphenylene ether, polycarbonate, polyester, a mixture of polycarbonate and polyester, polyamide, polyacetal, polyphenylene sulfide, polysulfone, polyimide, polyether ketone, polyetherether ketone, polyetherimide, polyamideimide, polyarylate, and the like. These may be used alone or in admixture thereof. Among these thermoplastic resins, polyvinyl chloride, polyethylene, polypropylene, cyclic olefin copolymers and acrylonitrile-styrene copolymer are preferable from the viewpoints of weatherability, thermal stability and the like.

In the thermoplastic resin composition of the present invention, the proportion of the thermoplastic resin and at least one of the isobutylene rubber particles and the graft copolymer is not particularly limited. In order to improve the impact resistance sufficiently, it is desirable that the content of at least one of the rubber particles and the graft copolymer particles in the composition is at least 1% by weight, preferably at least 3% by weight, in other words, the content of the thermoplastic resin in the composition is at most 99% by weight, preferably at most 97% by weight. Also from the viewpoint of maintaining the characteristics that the thermoplastic resin possesses, it is desirable that the content of at least one of the rubber particles and the graft copolymer in the composition is at most 70% by weight, preferably at most 50% by weight, in other words, the content of the thermoplastic resin in the composition is at least 30% by weight, preferably at least 50% by weight.

The thermoplastic resin composition of the present invention may contain one or more of various additives, for instance, a known impact modifier such as methyl methacrylate-butadiene-styrene copolymer (MBS resin), acrylic graft copolymer or acryl-silicone composite rubber-based graft copolymer; a stabilizer such as triphenyl phosphite or dibutyl tin maleate; a plasticizer such as dioctyl phthalate or dibutyl phthalate; a lubricant such as polyethylene wax, polypropylene wax or montan wax; a flame retardant, e.g., a phosphate flame retardant such as triphenyl phosphate or tricresyl phosphate, a bromine-containing flame retardant such as decabromobiphenyl or decabromobiphenyl ether, and other flame retardants such as antimony trioxide; a pigment such as titanium oxide, zinc sulfide or zinc oxide; a filler such as glass fiber, rock wool, asbestos, wollastonite, mica, talc or calcium carbonate; a processing assistant such as high molecular acrylic resin; and the like.

The thermoplastic resin composition of the present invention can be prepared in a usual mixing manner, for example, by mechanically mixing a thermoplastic resin and other ingredients and pelletizing the resulting mixture by using a known apparatus such as Banbury mixer, roll mill or twin-screw extruder. The obtained pellets can be molded in a wide temperature range, for example, by a usual molding machine such as injection molding machine, blow molding machine, extruder or the like.

The thermoplastic resin composition of the present invention exhibits an excellent impact resistance with maintaining other excellent properties such as weatherability and thermal stability and, therefore, it can be suitably used for production of extrusion-molded or calender-molded articles such as sheets, films, plates, boards, and articles having complicated shapes, which are useful in the fields of packaging material, building material, civil engineering material, automobile material, domestic electric appliances and other miscellaneous goods, blow molding products such as bottles, injection-molded articles for use in automobiles and electric appliances, and the like.

The present invention is more specifically described and explained by means of the following examples, in which all % and parts are by weight unless otherwise noted. It is to be understood that the present invention is not limited these examples.

EXAMPLE 1

(Preparation of isobutylene rubber particles R-1)

A mixture of 100 parts of an isobutylene polymer having a silicon-containing terminal group (a polymer having a number average molecular weight of 5,000 prepared by a method disclosed in JP-B-4-69659), 1 part of γ-methacryloyloxypropyltrimethoxysilane as a graftlinking agent and 50 parts of heptane as a solvent was added to 200 parts of water in which 1.4 parts of sodium lauryl sulfate emulsifier was dissolved. After pre-dispersing the mixture at 30,000 r.p.m. into water by a homomixer, the mixture was emulsified under a pressure of 900 kg/cm$^2$ by a high pressure homogenizer. The resulting mixture was placed in a separable flask equipped with a condenser, a nitrogen feeding tube and a stirrer, and thereto was added 2.4 parts of 1 N hydrochloric acid as a catalyst, and the mixture was heated at 70° C. for 5 hours with stirring at 250 r.p.m. in a nitrogen stream. The reaction mixture was then neutralized with 2.4 parts of a 1N aqueous solution of sodium hydroxide to give an aqueous latex of isobutylene rubber particles.

A part of the obtained latex was taken out, and coagulated by adding dropwise a 1.5% aqueous solution of alcium chloride. The precipitated particles were separated, washed and then dried at 40° C. for 15 hours to give a powder of isobutylene rubber (R-1).

The gel fraction of the obtained isobutylene rubber particles (R-1) was measured by immersing the particles in toluene with stirring at room temperature for 8 hours, centrifuging an toluene-insoluble matter at 30,000 r.p.m. for 60 minutes and calculating the weight fraction of the insoluble matter.

The results of the gel fraction and the average particle size are shown in Table 1.

EXAMPLE 2

(Preparation of isobutylene rubber particles R-2)

A mixture of 100 parts of an isobutylene polymer having a silicon-containing terminal group (a polymer having a number average molecular weight of 5,000 prepared by a method disclosed in JP-B-4-69659), 1 part of γ-methacryloyloxypropyltrimethoxysilane as a graftlinking agent and 50 parts of heptane as a solvent was added to 200 parts of water in which 1.0 part of sodium lauryl sulfate emulsifier was dissolved. After pre-dispersing the mixture at 30,000 r.p.m. into water by a homomixer, the mixture was emulsified under a pressure of 600 kg/cm$^2$ by a high pressure homogenizer. The resulting mixture was placed in a separable flask equipped with a condenser, a nitrogen feeding tube and a stirrer, and thereto, was added 2.4 parts of 1N hydrochloric acid as a catalyst, and the mixture was heated at 70° C. for 5 hours with stirring at 250 r.p.m. in a nitrogen stream. The reaction mixture was then neutralized with 2.4 parts of a 1N aqueous solution of sodium hydroxide to give an aqueous latex of isobutylene rubber particles.

A part of the obtained latex was taken out, and coagulated by adding dropwise a 1.5% aqueous solution of calcium chloride. The coagulated particles were separated, washed and then dried at 40° C. for 15 hours to give a powder of isobutylene rubber (R-2).

The gel fraction of the obtained isobutylene rubber particles (R-2) was measured in the same manner as in Example 1.

The results of the gel fraction and the average particle size are shown in Table 1.

EXAMPLE 3

(Preparation of isobutylene-based graft copolymer particles S-1)

A separable flask equipped with a condenser, a nitrogen feeding tube, a dropping funnel and a stirrer was charged with 80 parts (solid basis) of the latex of isobutylene rubber particles (R-1) obtained in Example 1 and then with 260 parts of water, 0.001 part of ferrous sulfate, 0.004 part of disodium ethylenediaminetetraacetate and 0. 1 part of formaldehyde sodium sulfoxylate. The mixture was heated to 70° C. with stirring at 200 r.p.m. in nitrogen stream. Subsequently, 18 parts of methyl methacrylate, 2 parts of n-butyl acrylate and 0.04 part of cumene hydroperoxide were put in the dropping funnel, and added dropwise to the latex over 2 hours, followed by stirring at 70° C. for 1 hour to give an aqueous latex of graft copolymer particles. The conversion of graft polymerization was 99%.

The obtained graft copolymer latex was coagulated by adding dropwise 200 parts of a 1.5% aqueous solution of calcium chloride, and the resulting particles were separated, washed and dried at 40° C. for 15 hours to give a powder of graft copolymer (S-1).

The graft efficiency of the obtained graft copolymer (S-1) was determined by measuring the gel fraction of the obtained crosslinked graft copolymer in the same manner as the measurement of the gel fraction of the crosslinked rubber particles in Example 1, and calculating the percentage of the amount of increase of the toluene-insoluble portion based on the graft polymerization with respect to the amount of the vinyl monomer used for the graft polymerization (sum of methyl methacrylate and n-butyl acrylate).

The results of the measurement of graft efficiency and average particle size are shown in Table 1

EXAMPLE 4
(Preparation of isobutylene-based graft copolymer particles S-2)

A separable flask equipped with a condenser, a nitrogen feeding tube, a dropping funnel and a stirrer was charged with 60 parts (solid basis) of the latex of isobutylene rubber particles (R-2) obtained in Example 2 and then with 260 parts of water, 0.0025 part of ferrous sulfate, 0.01 part of disodium ethylenediaminetetraacetate and 0.2 part of formaldehyde sodium sulfoxylate. The mixture was heated to 60° C. with stirring at 250 r.p.m. in nitrogen stream. Subsequently, 12 parts of acrylonitrile, 28 parts of styrene and 0.1 part of cumene hydroperoxide were put in the dropping funnel, and added dropwise to the latex over 4 hours, followed by stirring at 60° C. for 1 hour to give an aqueous latex of graft copolymer particles. The conversion of graft polymerization was 89%.

A part of the obtained graft copolymer latex was taken out and coagulated by adding dropwise a 1.5% aqueous solution of calcium chloride, and the resulting particles were separated, washed and dried at 40° C. for 15 hours to give a powder of graft copolymer (S-2).

The graft efficiency of the obtained graft copolymer (S-2) was measured in the same manner as above. The results are shown in Table 1.

In Table 1, the abbreviations denote the following materials.

Si-PIB: Polyisobutylene having a silicon-containing terminal group
TSMA: γ-Methacryloyloxypropyltrimethoxysilane
MMA: Methyl methacrylate
BA: n-Butyl acrylate
AN: Acrylonitrile
St: Styrene

TABLE 1

| | Crosslinked rubber particles | | | | | |
|---|---|---|---|---|---|---|
| | Ingredients (part) | | | Characteristics | | |
| Ex. No. | Isobutylene polymer Si-PIB | Graftlinking agent TSMA | Solvent Heptane | Gel fraction (%) | Average particle size (μm) | Identification of rubber particles |
| 1 | 100 | 1 | 50 | 80 | 0.21 | R-1 |
| 2 | 100 | 1 | 50 | 80 | 0.32 | R-2 |

| | Crosslinked graft copolymer particles | | | | | | |
|---|---|---|---|---|---|---|---|
| | Ingredients (part) | | | | | Characteristics | |
| | | | | | | Graft | Average |
| Ex. No. | Crosslinked rubber (solid content) | Vinyl monomer | | | | efficiency | particle | Identification of |
| | | MMA | BA | AN | St | (%) | size (μm) | graft copolymer |
| 3 | R-1 (80) | 18 | 2 | — | — | 80 | 0.23 | S-1 |
| 4 | R-2 (60) | — | — | 12 | 28 | 80 | 0.35 | S-2 |

EXAMPLE 5
(Preparation of thermoplastic resin composition)

Ten parts of the graft copolymer (S-1) obtained in Example 3 was incorporated as an impact modifier into a mixture of 100 parts of a vinyl chloride resin (commercially available under the trade mark "S1008" from Kaneka Corporation) as a thermoplastic resin, 2.5 parts of dibutyl tin maleate as a stabilizer, 0.5 part of a lubricant (commercially available under the trade mark "Hoechst Wax E" from Hoechst Japan), 2.0 parts of a processing assistant (commercially available under the trade mark "PA-20" from Kaneka Corporation) and 3.0 parts of titanium oxide pigment. The mixture was then kneaded at 180° C. for 5 minutes through rolls to form a sheet, and then subjected to heat press at 190° C. to give a specimen of a 3 mm thick molded article.

The Izod impact strength and weatherability of the obtained molded article were measured in the following manner.

The results are shown in Table 2. Izod impact strength:
Izod impact strength (V-notched) was measured at 23° C. and 0° C. according to ASTM D256-56.
Weatherability:
After exposing a specimen in a sunshine weather-O-meter (available from Suga Shikenki Kabushiki Kaisha, 63° C., with shower) for 500 hours and 1,000 hours, the Izod impact strength (notched) was measured in the same manner as above.

EXAMPLE 6

(Preparation of organosiloxane-based graft copolymer particles S-3)

A mixture of 100 parts of octamethyltetracyclosiloxane, 3.0 parts of tetraethoxysilane and 1.0 part of γ-methacryloyloxypropyltrimethoxysilane was added to 200 parts of water in which 1.4 parts of sodium lauryl sulfate was dissolved. After pre-dispersing the mixture at 30,000 r.p.m. into water by a homomixer, the mixture was emulsified under a pressure of 500 kg/cm² by a homogenizer. The resulting mixture was placed in a separable flask equipped with a condenser, a nitrogen feeding tube and a stirrer, and thereto was added 12.0 parts of 1N hydrochloric acid with stirring at 250 r.p.m. in a nitrogen stream to adjust the pH to about 1 and the mixture was stirred for 15 minutes. Thereafter, the mixture was heated at 90° C. for 5 hours with stirring at 250 r.p.m. in a nitrogen stream to conduct a reaction. After the completion of the reaction, the reaction mixture was allowed to stand at room temperature for a night. The reaction mixture was then neutralized with 12.0 parts of a 1N aqueous solution of sodium hydroxide to give an aqueous latex of polyorganosiloxane rubber particles. The rubber particles have an average particle size of 0.28 pm and a gel fraction of 85%.

A separable flask equipped with a condenser, a nitrogen feeding tube, a dropping funnel and a stirrer was charged with 80 parts (solid basis) of the obtained latex of the polyorganosiloxane rubber particles and then with 260 parts of water, 0.001 part of ferrous sulfate, 0.004 part of disodium ethylenediaminetetraacetate and 0.1 part of formaldehyde sodium sulfoxylate. The mixture was heated to 70° C. with stirring at 250 r.p.m. in a nitrogen stream. Subsequently, 18 parts of methyl methacrylate, 2 parts of n-butyl acrylate and 0.04 part of cumene hydroperoxide were put in the dropping funnel, and added dropwise to the latex over 2 hours, followed by stirring at 70° C. for 1 hour to give an aqueous latex of organosiloxane-based graft copolymer particles. The conversion of graft polymerization was 99%. Also, the average particle size of the graft copolymer particles was 0.30 μm and the graft efficiency was 95%.

The obtained graft copolymer latex was coagulated by adding dropwise 200 parts of a 1.5% aqueous solution of calcium chloride, and the resulting particles were separated, washed and dried at 40° C. for 15 hours to give a powder of organosiloxane-based graft copolymer (S-3). (Preparation of thermoplastic resin composition)

The procedure of Example 5 was repeated except that a combination of 8 parts of the graft copolymer (S-1) and 2 parts of the graft copolymer (S-3) was used as an impact modifier.

The results of measurement of the Izod impact strength and weatherability are shown in Table 2.

EXAMPLE 7

(Preparation of thermoplastic resin composition)

The procedure of Example 5 was repeated except that a combination of 2 parts of the graft copolymer (S-1) and 8 parts of a commercially available acrylic impact modifier (trade mark "Kaneace" FM-21, product of Kaneka Corporation) was used as an impact modifier. The results of measurement of the Izod impact strength and weatherability are shown in Table 2.

EXAMPLE 8

(Preparation of thermoplastic resin composition)

The procedure of Example 5 was repeated except that a combination of 8 parts of the graft copolymer (S-1) and 2 parts of a commercially available MBS resin(trade mark "Kaneace" M-511, product of Kaneka Corporation) was used as an impact modifier. The results of measurement of the Izod impact strength and weatherability are shown in Table 2.

COMPARATIVE EXAMPLE 1

(Preparation of thermoplastic resin composition)

The procedure of Example 5 was repeated except that a a commercially available acrylic impact modifier (trade mark "Kaneace" FM-21, product of Kaneka Corporation) was used instead of the graft copolymer S-1. The results of measurement of the Izod impact strength and weatherability are shown in Table 2.

COMPARATIVE EXAMPLE 2

(Preparation of thermoplastic resin composition)

The procedure of Example 5 was repeated except that a commercially available acrylic MBS resin (trade mark "Kaneace" M-511, product of Kaneka Corporation) was used instead of the graft copolymer S-1. The results of measurement of the Izod impact strength and weatherability are shown in Table 2.

In Table 2, the abbreviations denote the following materials.

PVC: Polyvinyl chloride (trade mark "S-1008")
S-1: Isobutylene-based graft copolymer obtained in Example 3
S-3: Organosiloxane-based graft copolymer obtained in Example 6
FM-21: Impact modifier "Kaneace" FM-21
M-511: Impact modifier "Kaneace" M-511

TABLE 2

| | Composition of thermoplastic resin composition (part) | | | | | Physical property | | | |
|---|---|---|---|---|---|---|---|---|---|
| | Thermoplastic resin | Impact modifier | | | | Izod impact strength (kg · cm/cm²) | | Weatherability (Izod impact strength at 23° C. after exposure) (kg · cm/cm²) | |
| | PVC | S-1 | S-3 | FM-21 | M-511 | 23° C. | 0° C. | After 500 hours | After 1000 hours |
| Ex. 5 | 100 | 10 | — | — | — | 70 | 30 | 50 | 40 |
| Ex. 6 | 100 | 8 | 2 | — | — | 130 | 40 | 100 | 80 |
| Ex. 7 | 100 | 2 | — | 8 | — | 50 | 20 | 40 | 30 |
| Ex. 8 | 100 | 8 | — | — | 2 | 75 | 35 | 50 | 35 |
| Com. Ex. 1 | 100 | — | — | 10 | — | 35 | 10 | 20 | 10 |

TABLE 2-continued

| | Composition of thermoplastic resin composition (part) | | | | | Physical property | | | |
|---|---|---|---|---|---|---|---|---|---|
| | | | | | | Izod impact strength | | Weatherability (Izod impact strength at 23° C. after exposure) (kg · cm/cm²) | |
| | Thermoplastic resin | Impact modifier | | | | (kg · cm/cm²) | | After 500 | After 1000 |
| | PVC | S-1 | S-3 | FM-21 | M-511 | 23° C. | 0° C. | hours | hours |
| Com. Ex. 2 | 100 | — | — | — | 10 | 80 | 35 | 15 | 5 |

From the results shown in Table 2, the thermoplastic resin compositions of the present invention are excellent in a balance between the impact resistance and the weatherability.

EXAMPLE 9
(Preparation of thermoplastic resin composition)

Into 100 parts of a polypropylene resin (trade mark "Noblen D501", product of Sumitomo Chemical Company, Ltd.) was incorporated 10 parts of the isobutylene rubber particles R-1 obtained in Example 1 as an impact modifier. The mixture was kneaded and pelletized at 200° C. with a twin-screw extruder equipped with a vent (32 mm, L/D=25.5).

The obtained pellets were dried at 80° C. for 15 hours and then subjected to injection molding at 230° C. to give a molded article having a size of 1 mm thick×120 mm×120 mm. for evaluation of physical properties.

The Izod impact strength of the molded article was measured in the same manner as in Example 5. The result is shown in Table 3.

COMPARATIVE EXAMPLE 3

The procedure of Example 9 was repeated ecxcept that an ethylene-propylene copolymer rubber (trade mark "Toughmer" P0680, product Mitsui Sekiyu Kagaku Kogyo Kabushiki Kaisha) was used instead of the isobutylene rubber (R-1). The result is shown in Table 3.

TABLE 3

| | Composition of thermoplastic resin composition (part) | | | Physical property |  |
|---|---|---|---|---|---|
| | Thermoplastic resin | Impact modifier | | Izod impact strength (kg · cm/cm²) | |
| | PP | R-1 | EPR | 23° C. | 0° C. |
| Ex. 9 | 100 | 10 | — | 30 | 15 |
| Com. Ex.3 | 100 | — | 10 | 20 | 5 |

(Notes)
PP: Polypropylene resin (Noblen D501)
R-1: Isobutylene rubber particles obtained in Example 1
EPR: Ethylene-propylene copolymer rubber (Toughmer P0680)

From the results shown in Table 3, it is understood that the thermoplastic resin composition of the present invention has an excellent impact resistance.

EXAMPLE 10
(Preparation of thermoplastic resin composition)

To 67 parts (solid basis) of an aqueous latex of a styrene-acrylonitrile copolymer (acrylonitrile/styrene=29/71) separately prepared by an emulsion polymerization was added 3.3 parts of the latex of graft copolymer S-2 obtained in Example 4. To the mixture was added dropwise a 1.5% aqueous solution of calcium chloride to coagulate the latex, and the precipitated particles were separated, washed and dried at 70° C. for 15 hours to give a thermoplastic resin composition in the form of a powder.

Into 100 parts of the thus obtained resin powder were incorporated 0.2 part of a phenol stabilizer and 0.5 part of ethylenebisstearylamide. The mixture was kneaded and pelletized at 230° C. with a twin-screw extruder equipped with a vent (32 mm, L/D=25.5).

The obtained pellets were dried at 70° C. for 15 hours and then subjected to injection molding at 230° C. to give a molded article for evaluation of physical properties.

The Izod impact strength of the molded article was measured in the same manner as in Example 5. The result is shown in Table 4.

COMPARATIVE EXAMPLE 4
(Preparation of acrylic graft copolymer particles S-4)

A mixture of 100 parts of n-butyl acrylate, 1.0 part of allyl acrylate and 0.5 part of 2,2'-azobis(2,4-dimethylvaleronitrile) was added to 200 parts of water in which 1.0 part of sodium lauryl sulfate and 2.0 parts of stearyl alcohol were dissolved. After pre-dispersing the mixture at 30,000 r.p.m. into water by a homomixer, the mixture was emulsified under a pressure of 200 kg/cm² by a homogenizer. The resulting mixture was placed in a separable flask equipped with a condenser, a nitrogen feeding tube and a stirrer. The mixture was then subjected to a reaction at 70° C. for 5 hours with stirring at 250 r.p.m. in a nitrogen stream to give an acrylic rubber latex. The rubber particles have an average particle size of 0.28 μm and a gel fraction of 95%.

A separable flask equipped with a condenser, a nitrogen feeding tube, a dropping funnel and a stirrer was charged with 60 parts (solid basis) of the obtained latex of the acrylic rubber particles and then with 260 parts of water, 0.0025 part of ferrous sulfate, 0.01 part of disodium ethylenediaminetetraacetate and 0.2 part of formaldehyde sodium sulfoxylate. The mixture was heated to 60° C. with stirring at 250 r.p.m. in a nitrogen stream. Subsequently, 12 parts of acrylonitrile, 28 parts of styrene and 0.1 part of cumene hydroperoxide were put in the dropping funnel, and added dropwise to the latex over 4 hours, followed by stirring at 60° C. for 1 hour to give an aqueous latex of acrylic graft copolymer particles. The conversion of graft polymerization was 88%. A part of the obtained graft copolymer latex was taken out and coagulated by adding dropwise a 1.5% aqueous solution of calcium chloride, and the precipitated particles were separated, washed and dried at 40° C. for 15 hours to give a powder of acrylic graft copolymer (S-4).
(Preparation of thermoplastic resin composition)

The procedure of Example 10 was repeated except that the thus obtained latex of acrylic graft copolymer (S-4) was used as an impact modifier instead of the latex of isobutylene-based graft copolymer S-2.

The result of measurement of the Izod impact strength is shown in Table 4.

TABLE 4

| | Composition of thermoplastic resin composition (part) | | | Physical property Izod impact strength (kg · cm/cm$^2$) | |
|---|---|---|---|---|---|
| | Thermoplastic resin | Impact modifier | | | |
| | AS | S-2 | S-4 | 23° C. | 0° C. |
| Ex. 10 | 67 | 33 | — | 25 | 20 |
| Com. Ex.4 | 67 | — | 33 | 15 | 10 |

(Notes)
AS: Acrylonitrile-styrene copolymer
S-2: Isobutylene-based graft copolymer obtained in Example 4
S-4: Acrylic graft copolymer obtained in Com. Ex. 4

From the results shown in Table 4, it is understood that the thermoplastic resin composition of the present invention has an excellent impact resistance.

As understood from the results shown above, the isobutylene rubber particles and the isobutylene-based graft copolymer particles of the present invention are particularly useful as an impact modifier for thermoplastic resins, and resin compositions comprising a thermoplastic resin and such an impact modifier can provide molded articles having an excellent improved impact resistance with maintaining excellent properties that the thermoplastic resin possesses such as weatherability and thermal stability.

Thus, the thermoplastic resin compositions of the present invention can be suitably used for the production of various molded articles, e.g., extrusion-molded or calender-molded articles of sheet, film, plate and articles having complicated shapes, which are useful in the fields of packaging, building, civil engineering, automobiles, domestic electric appliances and other miscellaneous goods; molded articles obtained by blow molding such as bottles; various injection-molded articles used for automobiles and electric appliances; and the like, and have very large industrial values.

In addition to the ingredients used in the Examples, other ingredients can be used in the Examples as set forth in the specification to obtain substantially the same results.

What we claim is:

1. An isobutylene rubber particle comprising an isobutylene polymer and a graftlinking agent selected from the group consisting of
   allyl methacrylate;
   β-methacryloyloxyethyldimethoxymethylsilane,
   γ-methacryloyloxypropylmethoxydimethylsilane,
   γ-methacryloyloxypropyldimethoxymethylsilane,
   γ-methacryloyloxypropyltrimethoxylane
   γ-methacryloyloxyproylethoxydimethylsilane,
   γ-methacryoyloxypropyldiethoxymethylsilane,
   γ-methacryoyloxypropyltriethoxysilane,
   δ-methacryloyloxybutyldiethoxymethylsilane,
   γ-acryloyloxypropyldimethoxymethylsilane,
   γ-acryloyloxypropyltrimethoxysilane, and other (meth) acrylic functional silane compounds; and
   γ-mercoptopropyltrimethoxysilane,
   γ-mercoptopropyldimethoxymethylsilane, and other mercapto functional silane compounds.

2. The rubber particle of claim 1, which is in the form of a latex wherein the rubber particles are emulsified in water.

3. The rubber particle of claim 1, wherein said isobutylene polymer further comprises a crosslinking agent.

4. The rubber particle of claim 1, wherein said isobutylene particle comprises 80 to 100% by weight of an isobutylene polymer, 0 to 20% by weight of a crosslinking agent and more than 0 to 20% by weight of a graftlinking agent.

5. The rubber particle of claim 1, wherein said isobutylene polymer is a polymer containing at least 50% by weight of units derived from an isobutylene monomer and having at least one reactive functional group selected from the group consisting of a halogen-containing group, a radical-reactive unsaturated group and a silicon-containing group at either or both of the molecular end and the molecular chain.

6. The rubber particle of claim 5, wherein said isobutylene polymer contains units derived from a diene monomer at either or both of the molecular end and the molecular chain.

7. The rubber particle of claim 5, wherein said isobutylene polymer contains at least one group selected from the group consisting of vinyl group, allyl group, isopropenyl group, acryloyl group and methacryloyl group at either or both of the molecular end and the molecular chain.

8. The rubber particle of claim 5, wherein said isobutylene polymer contains a silicon-containing group at either or both of the molecular end and the molecular chain.

9. The rubber particle of claim 1, which has an average particle size of 0.05 to 10 μm.

10. The rubber particle of claim 1, which has a gel fraction of at least 20% by weight.

11. A graft copolymer comprising the isobutylene rubber particle of claim 1 and a vinyl monomer graft-polymerized thereon.

12. The graft copolymer of claim 11, wherein said vinyl monomer is at least one member selected from the group consisting of an acrylic acid ester, a methacrylic acid ester, an aromatic alkenyl compound, a vinyl cyanide compound, a conjugated diene compound and a halogen-containing unsaturated compound.

13. The graft copolymer of claim 11, which is a graft copolymer of 10 to 95% by weight of said isobutylene rubber particle and 90 to 5% by weight of a vinyl monomer.

14. A resin composition comprising 1 to 99 parts by weight of at least one member selected from the group consisting of:
   (1) isobutylene rubber particles comprising an isobutylene polymer and a graftlinking agent selected from the group consisting of
      allyl methacrylate;
      β-methacryloyloxyethyldimntoxymethylsilane,
      γ-methacryloyloxypropylmethoxydimethylsilane,
      γ-methacryloyloxypropyldimethoxymethylsilane,
      γ-methacryloyloxypropyltrimethoxylane
      γ-methacryloyloxyproylethoxydimethylsilane,
      γ-methacryoyloxypropyldiethoxymethylsilane,
      γ-methacryoyloxypropyltriethoxysilane,
      δ-methacryloyloxybutyldiethoxymethylsilane,
      γ-acryloyloxypropyldimethoxymethylsilane,
      γ-acryloyloxypropyltrimethoxysilane, and other (meth)acrylic functional silane compounds; and
      γ-mercoptopropyltrimethoxysilane,
      γ-mercoptopropyldimethoxymethylsilane, and other mercapto functional silane compounds, and
   (2) a graft copolymer comprising said isobutylene rubber particles and a vinyl monomer graft-polymerized thereon,
and 99 to 1 part by weight of a thermoplastic resin.

15. The composition of claim 14, wherein said thermoplastic resin is at least one member selected from the group consisting of vinyl chloride resin, polyethylene, polypropylene, acrylonitrile-styrene copolymer, methyl methacrylate-styrene copolymer, cyclic olefin copolymer, polystyrene, polymethyl methacrylate, polycarbonate, polyester, polyamide, polyphenylene ether, polyacetal, polysulfone, polyphenylene sulfide, polyimide, polyamide-imide, polyether-imide, polyether-ketone, polyether-ether-ketone and polyarylate.

16. The composition of claim 14, wherein said thermoplastic resin is at least one member selected from the group consisting of polyvinyl chloride, polyethylene, polypropylene, acrylonitrile-styrene copolymer and cyclic olefin copolymer.

17. The rubber particle of claim 3, wherein the crosslinking agent is selected from the group consisting of:

benzoyl peroxide, dicumyl peroxide, di-t-butyl peroxide and 1,1-bis(t-hexylperoxy)-3,3,5-trimethylcyclohexane and other organic peroxides;

ethylene glycol dimethacrylate, propylene glycol dimethacrylate, 1,3-butylene glycol dimethacrylate, 1,4-butylene glycol dimethacrylate, and divinyl benzene;

trimethoxymethylsilane, triethoxyphenylsilane, and other trifunctional silane compounds; and tetramethoxysilane, tetraethoxysilane, tetrapropoxysilane, tetrabuthoxysilane, and other tetrafunctional silane compounds.

18. The rubber particle of claim 4, wherein the crosslinking agent is selected from the group consisting of:

benzoyl peroxide, dicumyl peroxide, di-t-butyl peroxide and 1,1-bis(t-hexylperoxy)-3,3,5-trimethylcyclohexane and other organic peroxides;

ethylene glycol dimethacrylate, propylene glycol dimethacrylate, 1,3-butylene glycol dimethacrylate, 1,4-butylene glycol dimethacrylate, and divinyl benzene;

trimethoxymethylsilane, triethoxyphenylsilane, and other trifunctional silane compounds; and tetramethoxysilane, tetraethoxysilane, tetrapropoxysilane, tetrabuthoxysilane, and other tetrafunctional silane compounds.

* * * * *